United States Patent Office 2,905,693
Patented Sept. 22, 1959

2,905,693

1,2-DIPHENYL-3,5-DIOXO-4-n-BUTYL-4-CARBOXY-METHYL-PYRAZOLIDINE

Franz Häfliger and Louis Muslin, Basel, Switzerland, assignors to Geigy Chemical Corporation, New York, N.Y., a corporation of Delaware No Drawing. Application July 22, 1957
Serial No. 673,114

Claims priority, application Switzerland August 3, 1956

1 Claim. (Cl. 260—310)

The present invention is concerned with new carboxylic acids of the pyrazole series and salts thereof, as well as the production of these compounds which have valuable pharmacological properties.

It has been found that the new 1.2-diaryl-3.5-dioxo-pyrazolidine-4-acetic acids and their salts of the general formula:

$$\begin{array}{c} Ar_1-N\text{------}N-Ar_2 \\ | \qquad\qquad | \\ OC \qquad CO \\ \diagdown \diagup \\ C \\ \diagup \diagdown \\ R \qquad C-CO-OH \\ \diagup \diagdown \\ R_1 \qquad H \end{array} \qquad I$$

wherein
$Ar_1$ and $Ar_2$ represent phenyl radicals which can be substituted by lower alkyl or alkoxy groups or halogen atoms,
R represents a lower alkyl radical, and
$R_1$ represents a hydrogen or a lower alkyl radical, have excellent antiphlogistic, antipyretic and analgetic activity.

To produce these compounds, a metal compound, in particular an alkali compound, of a 4-substituted 1.2-diaryl-3.5-dioxo-pyrazolidine of the general formula:

$$\begin{array}{c} Ar_1-N\text{------}N-Ar_2 \\ | \qquad\qquad | \\ OC \qquad CO \\ \diagdown \diagup \\ C \\ \diagup \diagdown \\ R \qquad H \end{array} \qquad II$$

or the tautomeric form thereof, wherein $Ar_1$, $Ar_2$ and R have the meanings given above, is reacted with an α-halogen alkane carboxylic acid ester of the general formula:

$$\begin{array}{c} X-C-CO-OR_2' \\ \diagup \diagdown \\ R_1 \qquad H \end{array} \qquad III$$

wherein
X represents a halogen atom, and
$R_2'$ represents a lower alkyl radical, and
$R_1$ has the meaning given above, the ester obtained is hydrolised if desired into the free acid and the latter, is converted in the usual way with an inorganic or organic base into a salt. For example, the reaction can be performed by dissolving a 4-substituted 1.2-diaryl-3.5-dioxo-pyrazolidine of the general Formula II in an alcoholic solution of an alkali alcoholate and then slowly adding the α-halogen alkane carboxylic acid ester of the general Formula III in the warm. Also diethylene glycol diethyl ether for example can be used instead of an alcohol as solvent for the alkali compound of the dioxo-pyrazolidine. The esters can be hydrolysed for example in aqueous/alcoholic alkali lyes whereby alkali salt solutions of the acids according to the present invention are obtained, from which, the free acids are separated by acidifying the solutions and, if desired, again converted into the salts with inorganic or organic bases.

Examples of starting materials of the general Formula II are the known 4-substituted 1.2-diaryl-3.5-dioxo-pyrazolidines such as 4-methyl-, 4-ethyl-, 4-n-propyl-, 4-isopropyl-, 4-n-butyl-, and 4-isobutyl- 1.2-diphenyl-3.5-dioxo-pyrazolidine and the correspondingly substituted 1.2-bis-(p-methyl-phenyl)-, 1.2-bis-(p-methoxy-phenyl)- and 1.2-bis-(p-chloro-phenyl)-3.5-dioxo-pyrazolidines. They can be reacted for example with the lower alkyl esters of chloro- and bromo- acetic acid, α-chloro- and α-bromo-propionic acid and α-chloro- and α-bromo- butyric acid.

On the other hand, also a metal compound, in particular an alkali compound, of a 4-substituted 1.2 diaryl-3.5-dioxo-pyrazolidine of the general formula:

$$\begin{array}{c} Ar_1-N\text{------}N-Ar_2 \\ | \qquad\qquad | \\ OC \qquad CO \\ \diagdown \diagup \\ C \\ \diagup \diagdown \\ H \qquad C-CO-OR_2' \\ \diagup \diagdown \\ R_1 \qquad H \end{array} \qquad IV$$

wherein $Ar_1$, $Ar_2$, $R_1$ and $R'$ have the meanings given above, can be reacted in an analogous manner with a halogen compound of the general formula:

$$R-X \qquad V$$

wherein X and R have the meanings given above, to form an ester of the general Formula I, this can be hydrolysed to form the free acid and, if desired, the latter can be converted into a salt with an inorganic or organic base.

The aqueous solutions of the alkali salts of the new carboxylic acids produced according to the present invention have an almost neutral reaction and can be applied for example intramuscularly or intravenously in the treatment of rheumatic complaints.

The following examples further illustrate the production of the new compounds. Parts are given as parts by weight and their relationship to parts by volume is as that of grammes to cubic centimeters. The temperatures are in degrees centigrade.

Example 1

(a) First 35.5 parts of sodium and then 462 parts of 1.2-diphenyl-3.5-dioxo-4-n-butyl-pyrazolidine are put into 1600 parts of abs. alcohol. The whole is brought to the boil and at boiling temperature 186 parts of chloroacetic acid ethyl ester are slowly added dropwise. After refluxing for 40 hours, the reaction mixture is cooled to room temperature, the sodium chloride formed is removed by filtration, and the filtrate is concentrated under reduced pressure. The residue is extracted with benzene and, after shaking well with 0.5 N-caustic soda lye, the benzene extract is dried over sodium sulphate. After distilling off the benzene, an oily crude product remains from which 1.2 - diphenyl - 3.5 - dioxo - 4 - n - butyl - 4 - carbethoxy-methyl-pyrazolidine is crystallised out from cyclohexane. The crystals melt at 81–82°.

(b) 462 parts of 1.2-diphenyl-3.5-dioxo-4-n-butyl-4-carbethoxy-methyl-pyrazolidine in 600 parts of alcohol are added to 74 parts pf. potassium hydroxide in 600 parts of water. After refluxing for 6 hours the solvent is distilled off in the vacuum, the residue is dissolved in 4000 parts of water and the solution is shaken out with ether. The aqueous solution which separates from the ether is treated with animal charcoal and then the reaction is made acid to Congo red paper with hydrochloric acid. The precipitate is extracted with chloroform, the chloroform solution is evaporated and 1.2-diphenyl-3.5-dioxo-4-n-butyl-4-carboxy-methyl-pyrazolidine is obtained from the residue by recrystallising it from benzene/cyclohexane. M.P. 146–148°.

Example 2

170 parts of 1.2-diphenyl-3.5-dioxo-4-isopropyl-pyrazolidine are dissolved in 225 parts by volume of sodium ethylate solution (produced from 225 parts by volume of ethanol and 13.3 parts of sodium), and 108 parts of α-bromopropionic acid ethyl ester are added dropwise within 15 minutes at boiling temperature. After refluxing for 17 hours the ethanol is distilled off and the residue is shaken with 1 N-caustic soda lye and ether. The ethereal phase is separated and the ether is distilled off. Unreacted α-bromopropionic acid ethyl ester is extracted from the residue with petroleum ether. The substance which remains is dissolved in 500 parts by volume of ethanol and 100 parts of water and then boiled under reflux for 6 hours with 32 parts of potassium hydroxide. After cooling, the 1.2-diphenyl-3.5-dioxo-4-isopropyl-4-(α-carbethoxy-ethyl)-pyrazolidine is extracted from the alkaline solution with ether, and the ether extract is evaporated. The crude ester is refluxed for another 12 hours with 6% alcoholic potassium lye and, after cooling, the unsaponified ester is extracted from the reaction mixture with chloroform. The alkaline solution is then acidified with 2 N-hydrochloric acid. 1.2-diphenyl-3.5-dioxo-4-isopropyl-4-(α-carboxy-ethyl)-pyrazolidine which precipitates, melts after recrystallisation from benzene/cyclohexane 1:10 at 171°.

What we claim is:

1.2 - diphenyl - 3.5 - dioxo - 4 - n - butyl - 4 - carboxymethyl-pyrazolidine.

References Cited in the file of this patent

FOREIGN PATENTS

| | | |
|---|---|---|
| 1,048,710 | France | Aug. 5, 1953 |
| 903,578 | Germany | Feb. 8, 1954 |